(12) United States Patent
Ferguson et al.

(10) Patent No.: US 11,200,613 B2
(45) Date of Patent: Dec. 14, 2021

(54) SYSTEMS AND METHODS FOR A SUBSCRIPTION SERVICE VIA AUTONOMOUS VEHICLES

(71) Applicant: Nuro, Inc., Mountain View, CA (US)

(72) Inventors: David Ferguson, San Francisco, CA (US); Jiajun Zhu, Palo Alto, CA (US); Cosimo Leipold, Washington, DC (US); Pichayut Jirapinyo, San Francisco, CA (US); Nan Ransohoff, San Francisco, CA (US)

(73) Assignee: NURO, INC., Mountain View, CA (US)

( * ) Notice: Subject to any disclaimer, the term of this patent is extended or adjusted under 35 U.S.C. 154(b) by 0 days.

(21) Appl. No.: 16/158,889

(22) Filed: Oct. 12, 2018

(65) Prior Publication Data

US 2019/0050790 A1      Feb. 14, 2019

Related U.S. Application Data

(63) Continuation-in-part of application No. PCT/US2018/044361, filed on Jul. 30, 2018.
(Continued)

(51) Int. Cl.
*G06Q 10/08* (2012.01)
*G06Q 20/00* (2012.01)
(Continued)

(52) U.S. Cl.
CPC ............ *G06Q 30/0631* (2013.01); *A23L 2/52* (2013.01); *A23L 5/00* (2016.08); *A23L 7/109* (2016.08); *A47J 37/0658* (2013.01); *A47J 47/00* (2013.01); *B60H 1/00364* (2013.01); *B60H 1/00735* (2013.01); *B60P 1/36* (2013.01);
(Continued)

(58) Field of Classification Search
None
See application file for complete search history.

(56) References Cited

U.S. PATENT DOCUMENTS 9,256,852 B1 *    2/2016   Myllymaki ........... G06Q 10/083
10,248,120 B1 *   4/2019   Siegel .................. G05D 1/0223
(Continued)

OTHER PUBLICATIONS

Lanctot, Accelerating the Future: The Economic Impact of the Emerging Passenger Economy, Strategy Analytics (Year: 2017).*
(Continued)

*Primary Examiner* — David P Sharvin
*Assistant Examiner* — Brock E Turk

(57) ABSTRACT

Systems and methods for autonomous delivery management are disclosed. In various embodiments, the system includes one or more processors and a memory storing instructions which, when executed by the processor(s), cause the autonomous delivery management system to provide a user interface for a customer to enter subscription information, receive subscription information from the user interface where the subscription information includes an item and a time interval for regularly delivering the item to the customer, store the subscription information, determine a handling itinerary for the item that includes delivery of the item in compliance with the time interval, and communicate instructions to an autonomous vehicle based on the handling itinerary.

20 Claims, 11 Drawing Sheets

Related U.S. Application Data

(60) Provisional application No. 62/538,538, filed on Jul. 28, 2017.

(51) Int. Cl.

| | | |
|---|---|---|
| G06Q 20/12 | (2012.01) | |
| G01C 21/20 | (2006.01) | |
| G06Q 30/06 | (2012.01) | |
| G08G 1/04 | (2006.01) | |
| B60P 3/00 | (2006.01) | |
| B60R 21/34 | (2011.01) | |
| B65G 67/24 | (2006.01) | |
| G01C 21/34 | (2006.01) | |
| G05D 1/00 | (2006.01) | |
| G05D 1/02 | (2020.01) | |
| G05D 1/12 | (2006.01) | |
| G06K 7/10 | (2006.01) | |
| G06Q 10/06 | (2012.01) | |
| G06Q 50/12 | (2012.01) | |
| G06Q 50/28 | (2012.01) | |
| G08G 1/00 | (2006.01) | |
| H04L 29/08 | (2006.01) | |
| G06N 20/00 | (2019.01) | |
| B60R 25/25 | (2013.01) | |
| A23L 5/00 | (2016.01) | |
| A23L 7/109 | (2016.01) | |
| G06F 16/955 | (2019.01) | |
| A23L 2/52 | (2006.01) | |
| A47J 37/06 | (2006.01) | |
| A47J 47/00 | (2006.01) | |
| B60H 1/00 | (2006.01) | |
| B60P 1/36 | (2006.01) | |
| B60P 3/025 | (2006.01) | |
| B60R 19/18 | (2006.01) | |
| G06K 7/14 | (2006.01) | |
| G06K 19/06 | (2006.01) | |
| G06Q 20/18 | (2012.01) | |
| G07F 17/00 | (2006.01) | |
| G07F 17/12 | (2006.01) | |
| G07C 5/02 | (2006.01) | |
| G07C 5/08 | (2006.01) | |
| G06K 9/00 | (2006.01) | |
| G06Q 50/30 | (2012.01) | |
| G06K 19/07 | (2006.01) | |
| H04W 4/024 | (2018.01) | |
| H04W 4/40 | (2018.01) | |
| G06Q 30/02 | (2012.01) | |
| B60R 19/48 | (2006.01) | |
| G06F 3/0484 | (2013.01) | |
| B60R 21/36 | (2011.01) | |
| H04N 5/76 | (2006.01) | |
| H05B 6/68 | (2006.01) | |

(52) U.S. Cl.
CPC ............ *B60P 3/007* (2013.01); *B60P 3/0257* (2013.01); *B60R 19/18* (2013.01); *B60R 19/483* (2013.01); *B60R 21/34* (2013.01); *B60R 25/25* (2013.01); *B60R 25/252* (2013.01); *B65G 67/24* (2013.01); *G01C 21/20* (2013.01); *G01C 21/343* (2013.01); *G01C 21/3438* (2013.01); *G01C 21/3453* (2013.01); *G05D 1/0027* (2013.01); *G05D 1/0033* (2013.01); *G05D 1/0038* (2013.01); *G05D 1/0061* (2013.01); *G05D 1/0088* (2013.01); *G05D 1/0094* (2013.01); *G05D 1/0212* (2013.01); *G05D 1/0214* (2013.01); *G05D 1/0223* (2013.01); *G05D 1/0231* (2013.01); *G05D 1/0276* (2013.01); *G05D 1/0291* (2013.01); *G05D 1/12* (2013.01); *G06F 16/955* (2019.01); *G06K 7/10297* (2013.01); *G06K 7/10722* (2013.01); *G06K 7/1413* (2013.01); *G06K 9/00201* (2013.01); *G06K 9/00791* (2013.01); *G06K 19/06028* (2013.01); *G06K 19/0723* (2013.01); *G06N 20/00* (2019.01); *G06Q 10/0631* (2013.01); *G06Q 10/0635* (2013.01); *G06Q 10/06315* (2013.01); *G06Q 10/08* (2013.01); *G06Q 10/083* (2013.01); *G06Q 10/0832* (2013.01); *G06Q 10/0833* (2013.01); *G06Q 10/0834* (2013.01); *G06Q 10/0835* (2013.01); *G06Q 10/0837* (2013.01); *G06Q 10/08355* (2013.01); *G06Q 20/00* (2013.01); *G06Q 20/127* (2013.01); *G06Q 20/18* (2013.01); *G06Q 30/0266* (2013.01); *G06Q 30/0645* (2013.01); *G06Q 50/12* (2013.01); *G06Q 50/28* (2013.01); *G06Q 50/30* (2013.01); *G07C 5/02* (2013.01); *G07C 5/08* (2013.01); *G07F 17/0057* (2013.01); *G07F 17/12* (2013.01); *G08G 1/04* (2013.01); *G08G 1/202* (2013.01); *H04L 67/12* (2013.01); *H04W 4/024* (2018.02); *H04W 4/40* (2018.02); *A23V 2002/00* (2013.01); *B60R 21/36* (2013.01); *B60R 2021/346* (2013.01); *G05D 2201/0207* (2013.01); *G05D 2201/0213* (2013.01); *G06F 3/0484* (2013.01); *G08G 1/22* (2013.01); *H04N 5/76* (2013.01); *H05B 6/688* (2013.01)

(56) References Cited

U.S. PATENT DOCUMENTS

| | | | | |
|---|---|---|---|---|
| 10,286,558 | B1* | 5/2019 | Asada | B25J 13/003 |
| 10,303,171 | B1* | 5/2019 | Brady | G08G 1/207 |
| 10,403,155 | B2* | 9/2019 | Kimchi | G05D 1/0088 |
| 2003/0195788 | A1* | 10/2003 | Loeb | G06Q 10/06 705/7.12 |
| 2010/0084426 | A1 | 4/2010 | Devers et al. | |
| 2014/0081445 | A1 | 3/2014 | Villamar | |
| 2015/0006005 | A1 | 1/2015 | Yu et al. | |
| 2015/0302495 | A1* | 10/2015 | Stuckman | G06Q 10/0835 705/26.35 |
| 2016/0098670 | A1* | 4/2016 | Oz | G06Q 10/083 705/27.1 |
| 2017/0174343 | A1 | 6/2017 | Erickson et al. | |
| 2017/0236092 | A1* | 8/2017 | High | G01C 21/34 705/338 |
| 2018/0058864 | A1* | 3/2018 | Lection | G06Q 30/0631 |

OTHER PUBLICATIONS

Stu Robarts, Delivering the future: Autonomous courier bots take to the streets, New Atlas, https://newatlas.com/starship-autonomous-delivery-robots-pilot/44277/, Jul. 11, 2016, p. 3 (Year: 2016).*

Choi, Sung-Chan, et al. "Enabling drone as a service: OneM2M-based UAV/drone management system." 2017 Ninth International Conference on Ubiquitous and Future Networks (ICUFN). IEEE, 2017. (Year: 2017).*

Notification of Transmittal of the International Search Report and the Written Opinion of the International Search Authority, or the Declaration issued in PCT application No. PCT/US2018/044361 dated Oct. 10, 2018, 12 pages.

* cited by examiner

SYSTEMS AND METHODS FOR A SUBSCRIPTION SERVICE VIA AUTONOMOUS VEHICLES

CROSS-REFERENCE TO RELATED APPLICATIONS

The present application is a continuation-in-part of International Application No. PCT/US2018/044361, filed on Jul. 30, 2018, which claims the benefit of U.S. Provisional Application No. 62/538,538, filed on Jul. 28, 2017. The entire contents of each of the foregoing applications are hereby incorporated by reference.

FIELD OF THE TECHNOLOGY

The present application relates to autonomous vehicles, and in particular, to systems and methods for a subscription service via autonomous vehicles.

BACKGROUND

The field of fully-autonomous and/or semi-autonomous robots is a growing field of innovation. Robots are being used for many purposes including warehouse inventory operations, household vacuuming robots, hospital delivery robots, sanitation robots, and military or defense applications.

In the consumer space, handling and delivery of items by autonomous vehicles could improve society in many ways. For example, rather than spending time driving to a store, a person can instead engage in productive work while waiting for an autonomous vehicle to deliver the items. With fewer vehicles on the road, traffic conditions would also improve. For example, instead of several people driving to stores in several vehicles, a single autonomous vehicle could deliver items to those people and thereby reduce the number of vehicles on the road. Accordingly, there is interest in developing technologies for delivering items via autonomous vehicles.

SUMMARY

This disclosure relates to a fully-autonomous and/or semi-autonomous robot fleet and, in particular, to a fleet of robot vehicles for transporting and delivering items for a subscription service.

In accordance with aspects of the present disclosure, an autonomous delivery management system includes one or more processors and a memory storing instructions which, when executed by the at least one processor, cause the autonomous delivery management system to provide a user interface for a customer to enter subscription information, receive subscription information from the user interface where the subscription information includes an item and a time interval for regularly delivering the item to the customer, store the subscription information, determine a handling itinerary for the item that includes delivery of the item in compliance with the time interval, and communicate instructions to an autonomous vehicle based on the handling itinerary.

In an aspect of the present disclosure, the item includes at least one of a drug prescription, a grocery, or another consumable.

In another aspect of the present disclosure, the subscription information includes an automatic payment method.

In an aspect of the present disclosure, the handling itinerary includes at least one of a pickup location, destination location, or a deadline for delivery.

In yet another aspect of the present disclosure, the instructions, when executed by the processor(s), further cause the autonomous delivery management system to transmit a notification about delivery details to the customer at a predetermined time before the delivery where the delivery details include at least one of deadline for delivery, location of delivery, product being delivered, or quantity of product, and receive an indication from the customer. The indication from the customer includes at least one of changes to the delivery details or a request for cancelling delivery.

In another aspect of the present disclosure, the instructions, when executed by the processor(s), further cause the autonomous delivery management system to change the handling itinerary based on the indication from the customer, and communicate instructions to an autonomous vehicle based on the changed handling itinerary.

In a further aspect of the present disclosure, the instructions, when executed by the processor(s), further cause the autonomous delivery management system to receive an indication from the autonomous vehicle indicating whether the delivery was successful or unsuccessful.

In an aspect of the present disclosure, the instructions, when executed by the processor(s), further cause the autonomous delivery management system to, in a case where the indication from the autonomous vehicle indicates that the delivery was unsuccessful, communicate instructions to the autonomous vehicle for additional handling of the item.

In an aspect of the present disclosure, the instructions, when executed by the processor(s), further cause the autonomous delivery management system to receive an indication from the user interface that location awareness in enabled, receive customer location information from the user interface, modify the handling itinerary for the item based on the customer location information, and communicate instructions to an autonomous vehicle based on the modified handling itinerary.

In yet another aspect of the present disclosure, a computer implemented method for providing autonomous delivery management includes providing a user interface for a customer to enter subscription information, receiving subscription information from the user interface where the subscription information includes an item and a time interval for regularly delivering the item to the customer, storing the subscription information, determining a handling itinerary for the item that includes delivery of the item in compliance with the time interval, and communicating instructions to an autonomous vehicle based on the handling itinerary.

In a further aspect of the present disclosure, the item includes at least one of a drug prescription, a grocery, or another consumable.

In a further aspect of the present disclosure, the subscription information includes an automatic payment method.

In yet a further aspect of the present disclosure, the handling itinerary includes at least one of a pickup location, destination location, or a deadline for delivery.

In a further aspect of the present disclosure, the computer implemented method further includes transmitting a notification about delivery details to the customer at a predetermined time before the delivery where the delivery details include at least one of: deadline for delivery, location of delivery, product being delivered, or quantity of product, and receiving an indication from the customer. The indication from the customer includes at least one of changes to the delivery details or a request for cancelling delivery.

In a further aspect of the present disclosure, the computer implemented method further includes changing the handling itinerary based on the indication from the customer, and communicating instructions to an autonomous vehicle based on the changed handling itinerary.

In yet a further aspect of the present disclosure, the method further includes receiving an indication from the autonomous vehicle indicating whether the delivery was successful or unsuccessful.

In an another aspect of the present disclosure, the method further includes, in a case where the indication from the autonomous vehicle indicates that the delivery was unsuccessful, communicating instructions to the autonomous vehicle for additional handling of the item.

In yet another aspect of the present disclosure, the computer implemented method further includes receiving an indication from the user interface that location awareness in enabled, receiving customer location information from the user interface, modifying the handling itinerary for the item to include the customer location information, and communicating instructions to an autonomous vehicle based on the modified handling itinerary.

Further details and aspects of exemplary embodiments of the present disclosure are described in more detail below with reference to the appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

DETAILED DESCRIPTION

Figure 1:
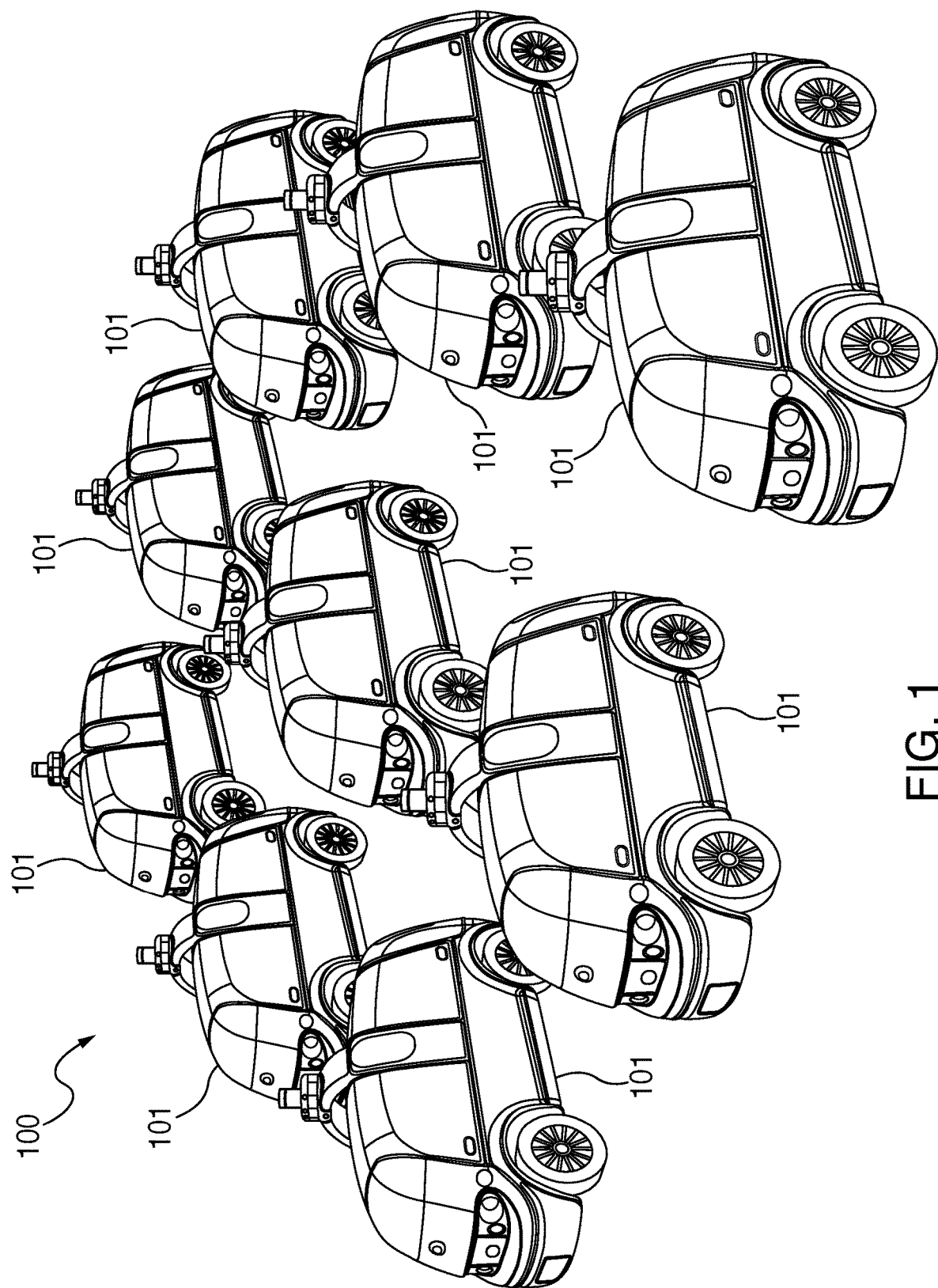
FIG. 1 is an exemplary view an autonomous robot fleet, wherein each vehicle within a fleet or sub-fleet can be branded for an entity.

This disclosure relates to a fully-autonomous and/or semi-autonomous robot fleet and, in particular, to robot vehicles for transporting or retrieving deliveries in either open unstructured outdoor environments or closed environments.

Provided herein is a robot fleet having robot vehicles operating fully-autonomously or semi-autonomously and a fleet management module for coordination of the robot fleet, where each robot within the fleet is configured for transporting, delivering or retrieving goods or services and is capable of operating in an unstructured open or closed environment. Each robot can include a power system, a conveyance system, a navigation module, at least one securable compartment or multiple securable compartments to hold goods, a controller configurable to associate each of the securable compartments to an assignable customer, a customer group within a marketplace, or provider and provide entry when authorized, a communication module and a processor configured to manage the conveyance system, the navigation module, the sensor system, the communication module and the controller.

As used herein, the term "autonomous" includes fully-autonomous, semi-autonomous, and any configuration in which a vehicle can travel in a controlled manner for a period of time without human intervention.

As used herein, the term "fleet," "sub-fleet," and like terms are used to indicate a number of land vehicles, watercraft or aircraft operating together or under the same ownership. In some embodiments the fleet or sub-fleet is engaged in the same activity. In some embodiments, the fleet or sub-fleet are engaged in similar activities. In some embodiments, the fleet or sub-fleet are engaged in different activities.

As used herein, the term "robot," "robot vehicle," "robot fleet," "vehicle," "all-terrain vehicle," and like terms are used to indicate a mobile machine that transports cargo, items, and/or goods. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land and water types), unmanned aircraft, and even including unmanned spacecraft.

As used herein, the term "compartment" is used to indicate an internal bay of a robot vehicle that has a dedicated door at the exterior of the vehicle for accessing the bay, and also indicates an insert secured within the bay. The term "sub-compartment" is generally used to indicate a subdivision or portion of a compartment. When used in the context of a compartment or sub-compartment, the term "module" may be used to indicate one or more compartments or sub-compartments.

As used herein, the term "user," "operator," "fleet operator," and like terms are used to indicate the entity that owns or is responsible for managing and operating the robot fleet.

As used herein, the term "customer" and like terms are used to indicate the entity that requests the services provided the robot fleet.

As used herein, the term "provider," "business," "vendor," "third party vendor," and like terms are used to indicate an entity that works in concert with the fleet owner or operator to utilize the services of the robot fleet to deliver the provider's product from and or return the provider's product to the provider's place of business or staging location.

As used herein, the term "server," "computer server," "central server," "main server," and like terms are used to indicate a computer or device on a network that manages the fleet resources, namely the robot vehicles.

As used herein, the term "controller" and like terms are used to indicate a device that controls the transfer of data from a computer to a peripheral device and vice versa. For example, disk drives, display screens, keyboards, and printers all require controllers. In personal computers, the controllers are often single chips. As used herein the controller is commonly used for managing access to components of the robot such as the securable compartments.

As used herein a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task. As used herein the fleet management module includes software modules for managing various aspects and functions of the robot fleet.

As used herein, the term "processor," "digital processing device" and like terms are used to indicate a microprocessor or central processing unit (CPU). The CPU is the electronic circuitry within a computer that carries out the instructions of a computer program by performing the basic arithmetic, logical, control and input/output (I/O) operations specified by the instructions.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX- like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatus used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory includes flash memory. In some embodiments, the non-volatile memory includes dynamic random-access memory (DRAM). In some embodiments, the non-volatile memory includes ferroelectric random access memory (FRAM). In some embodiments, the non-volatile memory includes phase-change random access memory (PRAM). In some embodiments, the device is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In various some embodiments, on OLED display is a passive-matrix OLED (PMOLED) or active-matrix OLED (AMOLED) display. In some embodiments, the display is a plasma display. In some embodiments, the display is a video projector. In some embodiments, the display is interactive (e.g., having a touch screen or a sensor such as a camera, a 3D sensor, a LiDAR, a radar, etc.) that can detect user interactions/gestures/responses and the like. In still some embodiments, the display is a combination of devices such as those disclosed herein.

The Fleet of Robot Vehicles

Provided herein is a robot fleet 100, as illustrated in FIG. 1, having robot vehicles 101, with each one operating fully-autonomously or semi-autonomously.

As illustrated in FIGS. 3-6, one exemplary configuration of a robot 101 is a vehicle configured for land travel, such as a small fully-autonomous (or semi-autonomous) automobile. The exemplary fully-autonomous (or semi-autonomous) automobile is narrow (i.e., 2-5 feet wide), low mass and low center of gravity for stability, having multiple secure compartments assignable to one or more customers, retailers and/or vendors, and designed for moderate working speed ranges (i.e., 1.0-45.0 mph) to accommodate inner-city and residential driving speeds. Additionally, in some embodiments, the land vehicle robot units in the fleet are configured with a maximum speed range from 1.0 mph to about 90.0 mph for high speed, intrastate or interstate driving. Each robot in the fleet is equipped with onboard sensors 170 (e.g., cameras (running at a high frame rate, akin to video), LiDAR, radar, ultrasonic sensors, microphones, etc.) and internal computer processing to constantly determine where it can safely navigate, what other objects are around each robot and what it may do.

In in some embodiments, the robot fleet is fully-autonomous.

In in some embodiments, the robot fleet is semi-autonomous. In some embodiments, it may be necessary to have human interaction between the robot 101, the fleet operator 200, the provider 204 and/ or the customer 202 to address previously unforeseen issues (e.g., a malfunction with the navigation module; provider inventory issues; unanticipated traffic or road conditions; or direct customer interaction after the robot arrives at the customer location).

In in some embodiments, the robot fleet 100 is controlled directly by the user 200. In some embodiments, it may be necessary to have direct human interaction between the robot 101 and/or the fleet operator 200 to address maintenance issues such as mechanical failure, electrical failure or a traffic accident.

In some embodiments, the robot fleet is configured for land travel. In some embodiments, each robot land vehicle in the fleet is configured with a working speed range from 13.0 mph to 45.0 mph. In some embodiments, the land vehicle robot units in the fleet are configured with a maximum speed range from 13.0 mph to about 90.0 mph.

In some embodiments, the robot fleet is configured for water travel as a watercraft and is configured with a working speed range from 1.0 mph to 45.0 mph.

In some embodiments, the robot fleet is configured for hover travel as an over-land or over- water hovercraft and is configured with a working speed range from 1.0 mph to 60.0 mph.

In some embodiments, the robot fleet is configured for air travel as an aerial drone or aerial hovercraft and is configured with a working speed range from 1.0 mph to 80.0 mph.

In some embodiments of the robot fleet, the autonomous robots within the fleet are operated on behalf of third party vendor/service provider.

For example, a fleet management service is established to provide a roving delivery service for a third party beverage/food provider (e.g., a coffee service/experience for a third party vendor (i.e., Starbucks)). It is conceived that the fleet management service would provide a sub-fleet of "white label" vehicles carrying the logo and products of that third party beverage/food provider to operate either fully-autonomously or semi-autonomously to provide this service.

In some embodiments of the robot fleet, the autonomous robots within the fleet are further configured to be part of a sub-fleet of autonomous robots, and each sub-fleet is configured to operate independently or in tandem with multiple sub-fleets having two or more sub-fleets (100-a, 100-b).

For example, a package delivery service is configured to offer multiple levels of service such as "immediate dedicated rush service," "guaranteed morning/ afternoon delivery service," or "general delivery service." A service provider could then have a dedicated sub-fleet of delivery vehicles for each type of service within their overall fleet of vehicles. In yet another example, a third party has priority over a certain number of vehicles in the fleet. In so doing, they can guarantee a certain level of responsiveness. When they aren't using the vehicles, the vehicles are used for general services within the fleet (e.g., other third parties).

In some embodiments, the robot fleet is controlled directly by the user.

In some embodiments, there will likely be times when a vehicle breaks down, has an internal system or module failure or is in need of maintenance. For example, in the event that the navigation module should fail, each robot within the fleet is configurable to allow for direct control of the robot's processor to override the conveyance and sensor systems (i.e., cameras, etc.) by a fleet operator to allow for the safe return of the vehicle to a base station for repair.

The Operating Environments

In some embodiments, the unstructured open environment is a non-confined geographic region accessible by navigable pathways, including, for example, public roads, private roads, bike paths, open fields, open public lands, open private lands, pedestrian walkways, lakes, rivers or streams.

In some embodiments, the closed environment is a confined, enclosed or semi-enclosed structure accessible by navigable pathways, including, for example, open areas or rooms within commercial architecture, with or without structures or obstacles therein, airspace within open areas or rooms within commercial architecture, with or without structures or obstacles therein, public or dedicated aisles, hallways, tunnels, ramps, elevators, conveyors, or pedestrian walkways.

In some embodiments, the unstructured open environment is a non-confined airspace or even near-space environment which includes all main layers of the Earth's atmosphere including the troposphere, the stratosphere, the mesosphere, the thermosphere and the exosphere.

In some embodiments, the navigation module controls routing of the conveyance system of the robots in the fleet in the unstructured open or closed environments.

The Fleet Management Module

In some embodiments of the robot fleet 100, the fleet includes a fleet management module 120 (associated with a central server) for coordination of the robot fleet 100 and assignment of tasks for each robot 101 in the fleet. The fleet management module coordinates the activity and positioning of each robot in the fleet. In addition to communicating with the robot fleet, fleet owner/operator and/or user, the fleet management module also communicates with providers/vendors/businesses and customers to optimize behavior of the entire system.

The fleet management module works in coordination with a central server 110, typically located in a central operating facility owned or managed by the fleet owner 200.

Figure 11:
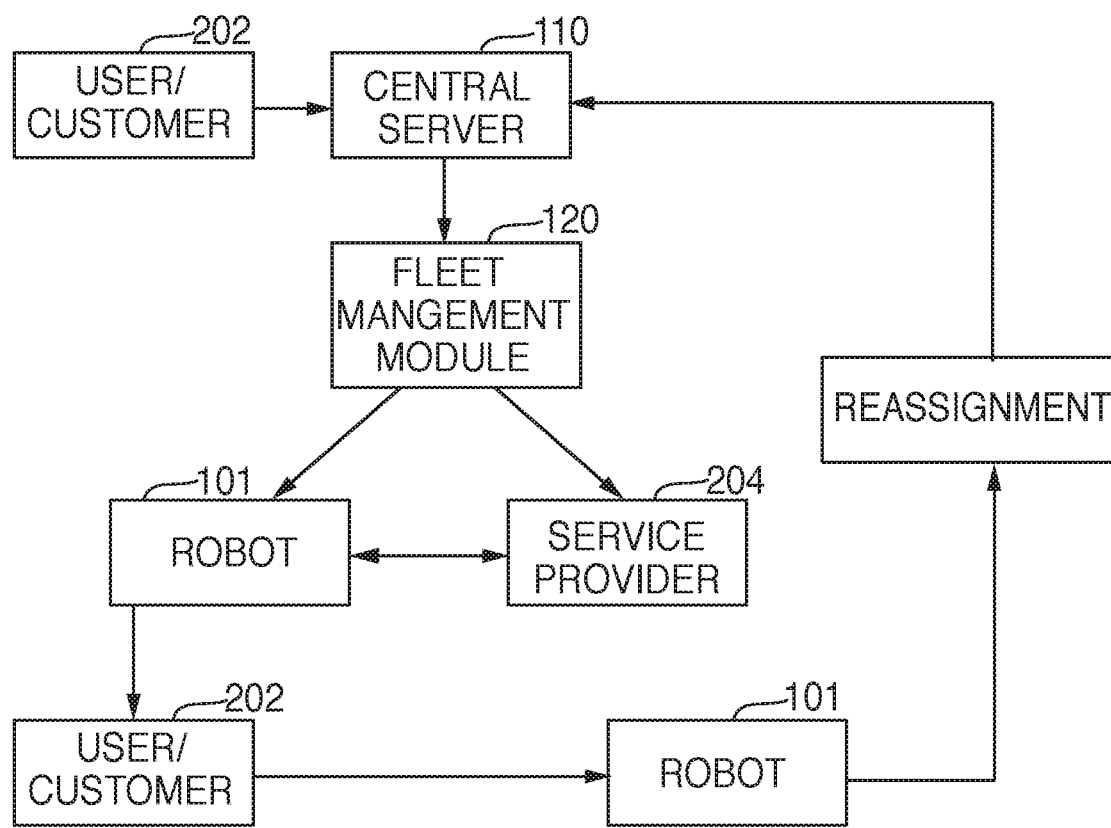
FIG. 11 is an exemplary flowchart representation of the logic for a fleet management control module associated with a central server for the robot fleet.

As illustrated in FIG. 11, in one embodiment, a request is sent to a main server 110 (typically located at the fleet owner's or fleet manager's location), which then communicates with the fleet management module 120. The fleet management module then relays the request to the appropriate provider 204 of the service (e.g., restaurant, delivery service, vendor or retailer) and an appropriate robot or robots 101 in the fleet. The best appropriate robot(s) in the fleet within the geographic region and typically closest to the service provider, is then assigned the task, and the provider of the service 204 then interacts with that robot 101 at their business (e.g., loading it with goods, if needed). The robot then travels to the customer 202 and the customer interacts with the robot to retrieve their goods or service (e.g., the goods ordered). An interaction can include requesting the robot to open its compartment 102, 104 through the customer's app or through a user interface on the robot itself (using, e.g., RFID reader and customer phone, a touchpad, a keypad, voice commands, vision-based recognition of the person, etc.). Upon completion of the delivery (or retrieval, if appropriate), the robot reports completion of the assignment and reports back to the fleet management module for re-assignment.

Figure 12:
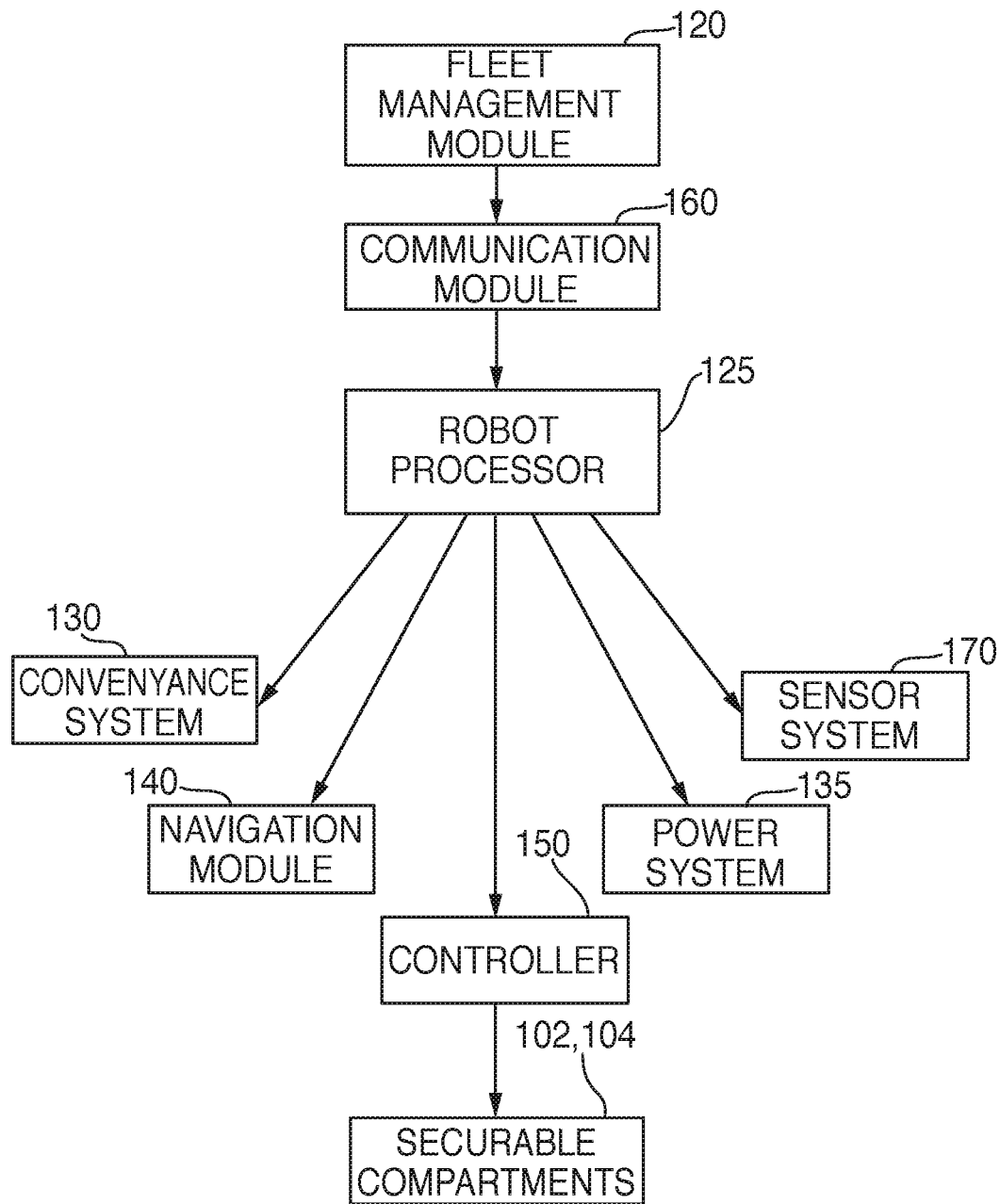
FIG. 12 is an exemplary flowchart representation of the logic flow from the Fleet Management Control Module through the robot processor to the various systems and modules of the robot.

As further illustrated in FIG. 12, and previously noted, in some embodiments, the fleet management module 120 handles coordination of the robot fleet 100 and assignment of tasks for each robot 101 in the fleet. The fleet management module coordinates the activity and positioning of each robot in the fleet. The fleet management module also communicates with vendors/businesses 204 and customers 202 to optimize behavior of entire system. It does this by utilizing the robot's processor 125 to process the various inputs and outputs from each of the robot's systems and modules, including: the conveyance system 130, the power system 135, the navigation module 140, the sensor system 170, 175, the communication module 160, and the controller 150, to effectively manage and coordinate the various functions of each robot in the fleet.

In some embodiments, the robot may be requested for a pick-up of an item (e.g., a document) with the intent of delivery to another party. In this scenario, the fleet management module would assign the robot to arrive at a given location, assign a securable compartment for receipt of the item, confirm receipt from the first party to the fleet management module, then proceed to the second location where an informed receiving party would recover the item from the robot using an appropriate PIN or other recognition code to gain access to the secure compartment. The robot would then reports completion of the assignment and report back to the fleet management module for re-assignment.

Conveyance Systems

Each robot vehicle 101 in the fleet includes a conveyance system 130 (e.g., a drive system with a propulsion engine, wheels, treads, wings, rotors, blowers, rockets, propellers, brakes, etc.).

As noted previously, the robot fleet is configurable for land, water or air. Typical vehicles include cars, wagons, vans, unmanned motor vehicles (e.g., tricycles, trucks, trailers, buses, etc.), unmanned railed vehicles (e.g., trains, trams, etc.), unmanned watercraft (e.g., ships, boats, ferries, landing craft, barges, rafts, etc.), aerial drones, unmanned hovercraft (air, land, and water types), unmanned aircraft, and unmanned spacecraft.

In one exemplary embodiment, a robot land vehicle 101 is configured with a traditional 4-wheeled automotive configuration comprising conventional steering and braking systems. The drive train is configurable for standard 2-wheel drive or 4-wheel all-terrain traction drive. The propulsion system (engine) is configurable as a gas engine, a turbine engine, an electric motor and/or a hybrid gas/electric engine. Alternatively, the robot could be configured with an auxiliary solar power system 135 to provide back-up emergency power or power for minor low-power sub-systems.

Alternative configurations of components to a total drive system with a propulsion engine could include wheels, treads, wings, rotors, blowers, rockets, propellers, brakes, etc.

In some embodiments, the robot fleet is configured for water travel as a watercraft with a propulsion system (engine) that is configurable as a gas engine, a turbine engine, an electric motor and/or a hybrid gas/electric engine and is further configured with a propeller.

In some embodiments, the robot fleet is configured for hover travel as an over-land or over-water hovercraft or an air-cushion vehicle (ACV) and is configured with blowers to produce a large volume of air below the hull that is slightly above atmospheric pressure. The propulsion system (engine) is configurable as a gas engine, a turbine engine, an electric motor and/or a hybrid gas/electric engine.

In some embodiments, the robot fleet is configured for air travel as an aerial drone or aerial hovercraft and is configured with wings, rotors, blowers, rockets, and/or propellers and an appropriate brake system. The propulsion system (engine) is configurable as a gas engine, a turbine engine, an electric motor and/or a hybrid gas/electric engine.

The Power System

In some embodiments, each robot of the robot fleet is configured with one or more power sources, which include the power system 135 (e.g., battery, solar, gasoline, propane, etc.).

Navigation Module

Each robot in the fleet further includes a navigation module 140 for navigation in the unstructured open or closed environments (e.g., digital maps, HD maps, GPS, etc.). In some embodiments, the fleet 100 relies on maps generated by the user, operator, or fleet operator, specifically created to cover the intended environment where the robot is configured to operate. These maps would then be used for general guidance of each robot in the fleet, which would augment this understanding of the environment by using a variety of on-board sensors such as cameras, LiDAR, altimeters or radar to confirm its relative geographic position and elevation.

In some embodiments, for navigation, the fleet of robots uses internal maps to provide information about where they are going and the structure of the road environment (e.g., lanes, etc.) and combine this information with onboard sensors (e.g., cameras, LiDAR, radar, ultrasound, microphones, etc.) and internal computer processing to constantly determine where they can safely navigate, what other objects are around each robot and what they may do. In still other embodiments, the fleet incorporates on-line maps to augment internal maps. This information is then combined to determine a safe, robust trajectory for the robot to follow and this is then executed by the low level actuators on the robot.

In some embodiments, the fleet relies on a global positioning system (GPS) that allows land, sea, and airborne users to determine their exact location, velocity, and time 24 hours a day, in all weather conditions, anywhere in the world.

In some embodiments, the fleet of robots will use a combination of internal maps, sensors and GPS systems to confirm its relative geographic position and elevation.

In some embodiments, the autonomous fleet is strategically positioned throughout a geographic region in anticipation of a known demand.

Over time, a user 200 and/or a vendor 204 can anticipate demand for robot services by storing data concerning how many orders (and what type of orders) are made at particular times of day from different areas of the region. This can be done for both source (e.g., restaurants, grocery stores, general businesses, etc.) and destination (e.g., customer, other businesses, etc.). Then, for a specific current day and time, this stored data is used to determine what the optimal location of the fleet is given the expected demand. More concretely, the fleet can be positioned to be as close as possible to the expected source locations, anticipating these source locations will be the most likely new orders to come into the system. Even more concretely, it is possible to estimate the number of orders from each possible source in the next hour and weight each source location by this number. Then one can position the fleet so that the fleet optimally covers the weighted locations based on these numbers.

In some embodiments of the robot fleet, the positioning of robots can be customized based on: anticipated use, a pattern of historical behaviors, or specific goods being carried.

Sensor Systems

As noted previously, each robot is equipped with a sensor system 170, which includes at least a minimum number of onboard sensors (e.g., cameras (for example, those running at a high frame rate akin to video), LiDAR, radar, ultrasonic sensors, microphones, etc.) and internal computer processing 125 to constantly determine where it can safely navigate, what other objects are around each robot, and what it may do within its immediate surroundings.

In some embodiments, the robots of the robot fleet further include conveyance system sensors 175 configured to: monitor drive mechanism performance (e.g., the propulsion engine); monitor power system levels 135 (e.g., battery, solar, gasoline, propane, etc.); or monitor drive train performance (e.g., transmission, tires, brakes, rotors, etc.).

Communications Module

Each robot in the fleet further includes a communication module 160 configurable to receive, store and send data to the fleet management module, to a user, to and from the fleet management module 120, and to and from the robots in the fleet 100. In some embodiments, the data is related to at least user interactions and the robot fleet interactions, including, for example, scheduled requests or orders, on-demand requests or orders, or a need for self-positioning of the robot fleet based on anticipated demand within the unstructured open or closed environments.

In some embodiments, each robot in the fleet includes at least one communication module configurable to receive, store and transmit data, and to store that data to a memory device, for future data transfer or manual download.

In some embodiments, each business 204 and customer 202 has their own app/interface to communicate with the fleet operator 200 (e.g., "Nuro customer app" for customers on their phone, "Nuro vendor app" for businesses on a tablet or phone or their internal computer system, etc.).

In some embodiments, the communication to the user and the robots in the fleet, between the robots of the fleet, and between the user and the robots in the fleet, occurs via wireless transmission.

In some embodiments, the user's wireless transmission interactions and the robot fleet wireless transmission interactions occur via mobile application transmitted by an electronic device and forwarded to the communication module via: a central server, a fleet management module, and/or a mesh network.

In some embodiments, one preferred method of communication is to use cellular communication between the fleet manager and fleet of robots, (e.g., 3G, 4G, 5G, or the like). Alternatively, the communication between the fleet control module and the robots could occur via satellite communication systems.

In some embodiments, a customer uses an app (either on a cellphone, laptop, tablet, computer or any interactive device) to request a service (e.g., an on-demand food order or for a mobile marketplace robot to come to them).

In some embodiments, the electronic device includes: a phone, a personal mobile device, a personal digital assistant (PDA), a mainframe computer, a desktop computer, a laptop computer, a tablet computer, and/or wearable computing device such as a communication headset, smart glasses, a contact lens or lenses, a digital watch, a bracelet, a ring, jewelry, or a combination thereof.

Goods and Services

In some embodiments, the user includes a fleet manager, a sub-contracting vendor, a service provider, a customer, a business entity, an individual, or a third party.

In some embodiments, the services include: subscription services, prescription services, marketing services, advertising services, notification services, or requested, ordered or scheduled delivery services. In particular embodiments, the scheduled delivery services include, by way of example, special repeat deliveries such as groceries, prescriptions, drinks, mail, documents, etc.

In some embodiments, the services further include: the user receiving and returning the same or similar goods within the same interaction (e.g., signed documents), the user receiving one set of goods and returning a different set of goods within the same interaction, (e.g., product replacement/ returns, groceries, merchandise, books, recording, videos, movies, payment transactions, etc.), a third party user providing instruction and or authorization to a goods or service provider to prepare, transport, deliver and/or retrieve goods to a principle user in a different location.

In some embodiments, the services further include: advertising services, land survey services, patrol services, monitoring services, traffic survey services, signage and signal survey services, architectural building or road infrastructure survey services.

In some embodiments, at least one robot is further configured to process or manufacture goods.

In some embodiments, the processed or manufactured goods include: beverages, with or without condiments (such as coffee, tea, carbonated drinks, etc.); various fast foods; or microwavable foods.

In some embodiments, the robots within the fleet are equipped for financial transactions. These can be accomplished using known transaction methods such as debit/credit card readers or the like.

Securable Compartments

Figure 2:
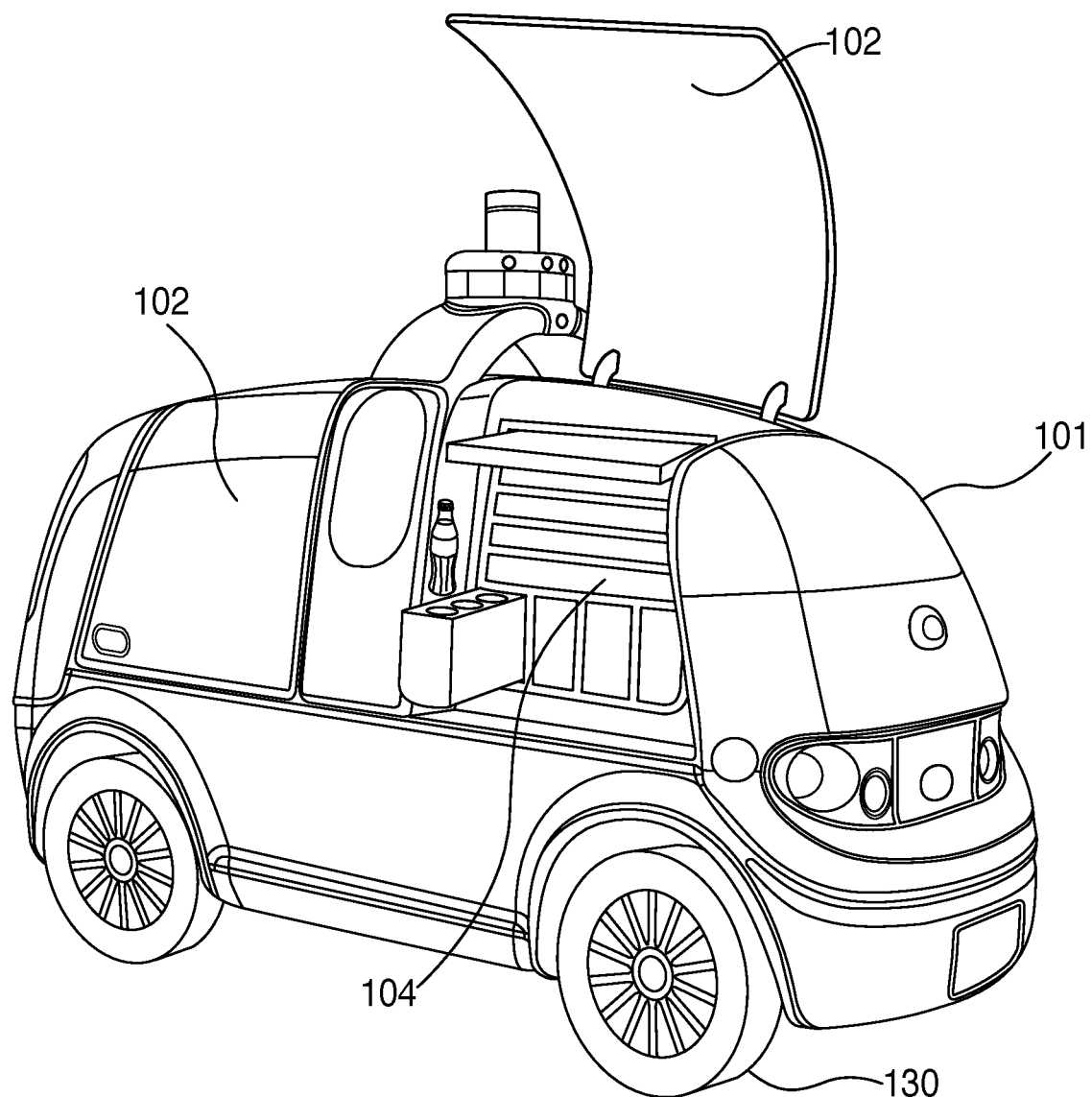
FIG. 2 is an exemplary ISO view of a robot vehicle, part of an autonomous robot fleet, illustrating securable compartments within the vehicle.
Figure 3:
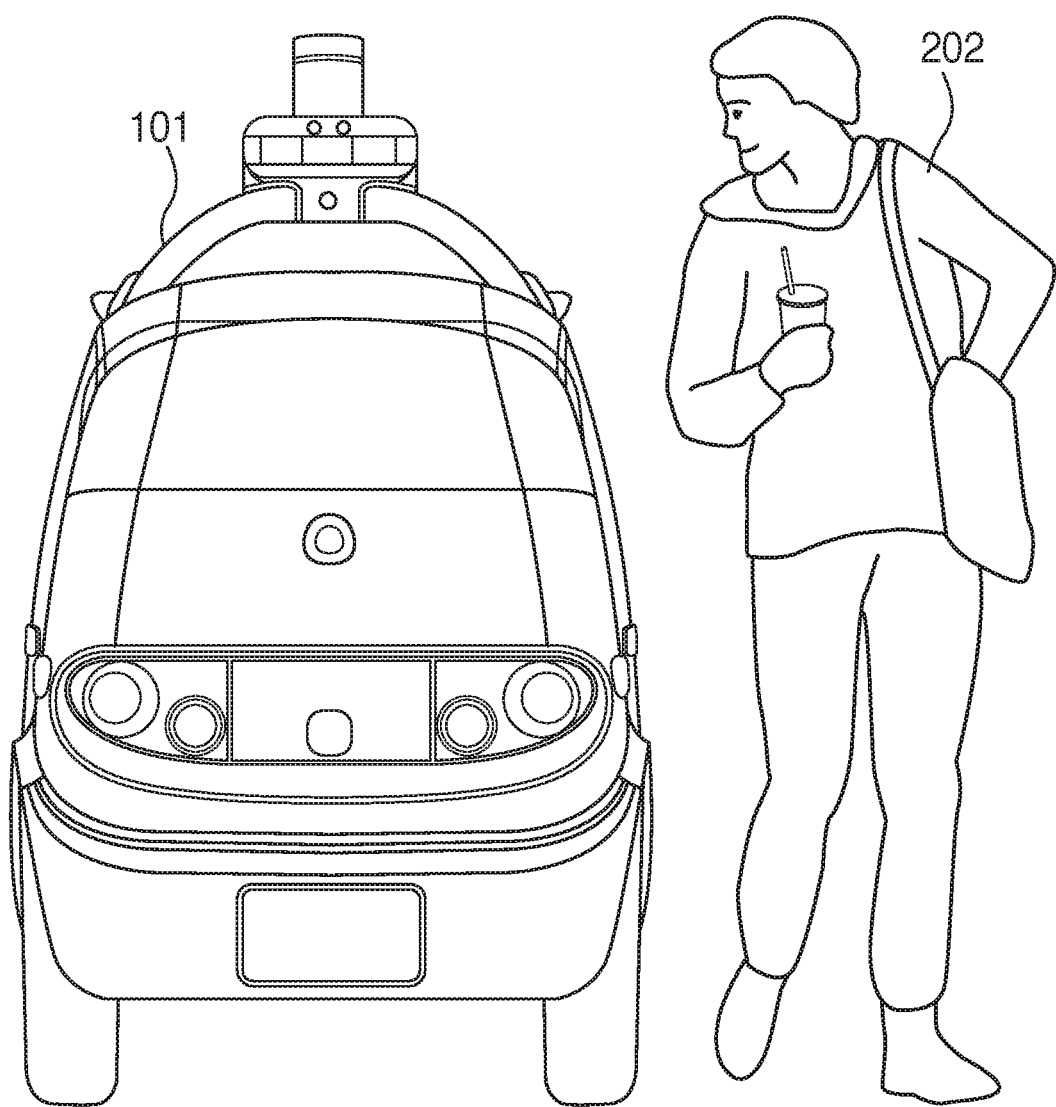
FIG. 3 is an exemplary front view of a robot vehicle, part of an autonomous robot fleet, shown in comparison to the height of an average person.
Figure 4:
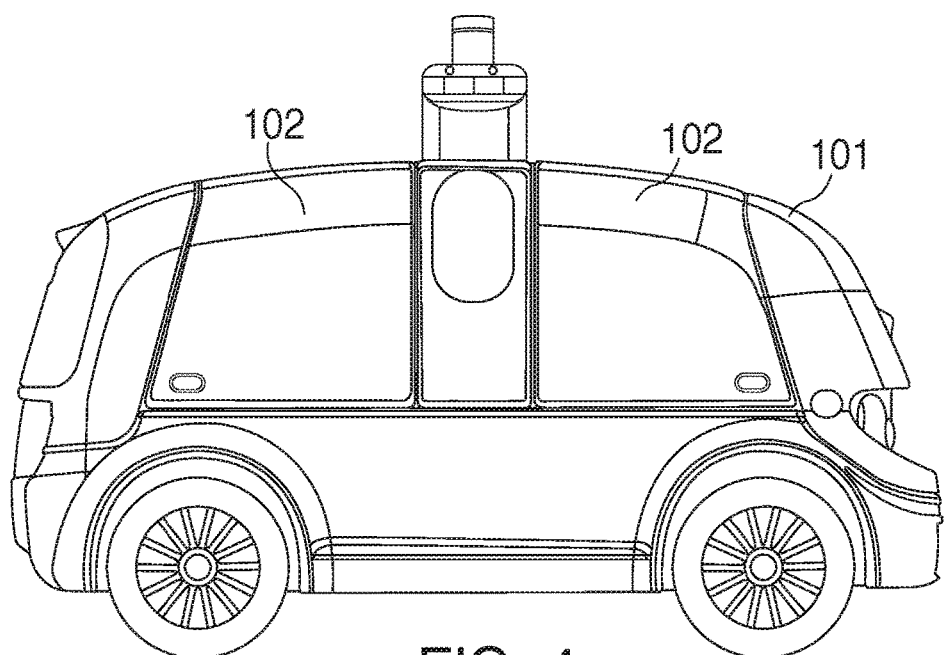
FIG. 4 is an exemplary right side view of a robot vehicle, part of an autonomous robot fleet, illustrating a configuration with two large side doors, each enclosing securable compartments.
Figure 5:
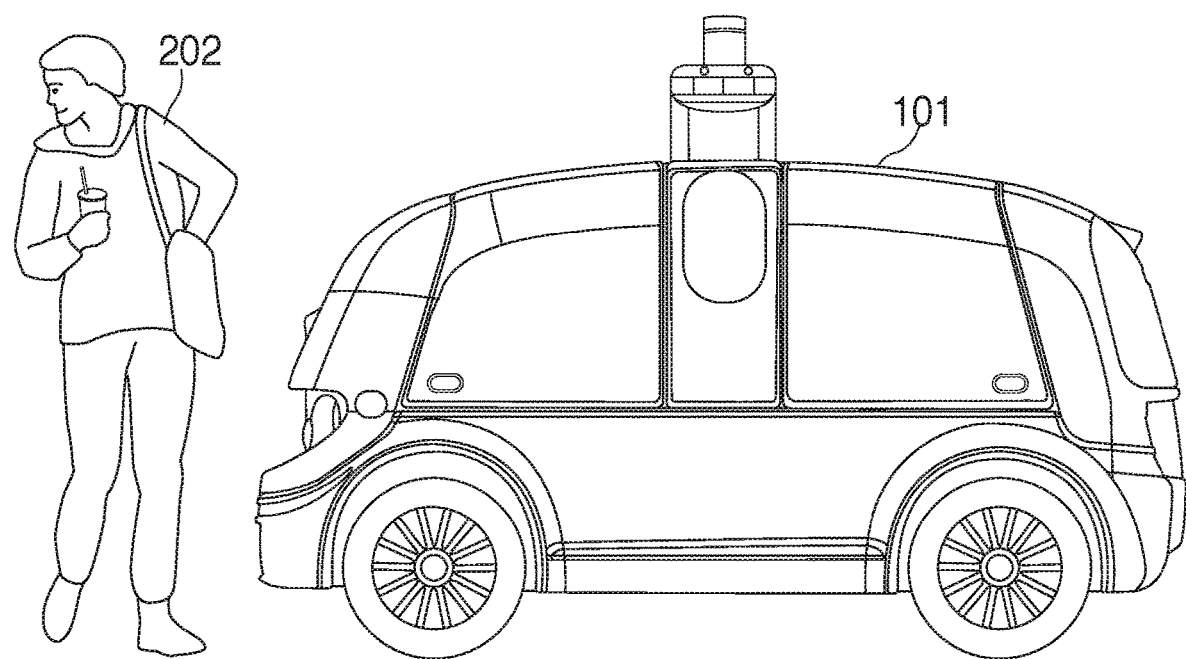
FIG. 5 is an exemplary left side view of a robot vehicle, part of an autonomous robot fleet, shown in comparison to the height of an average person.
Figure 6:
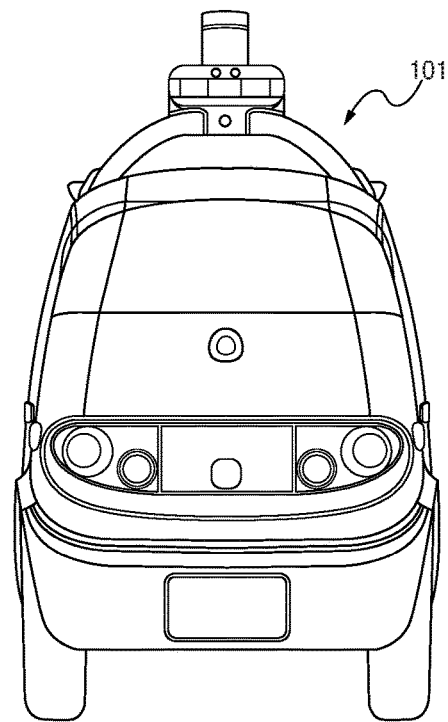
FIG. 6 is an exemplary rear view of a robot vehicle, part of an autonomous robot fleet.
Figure 7:
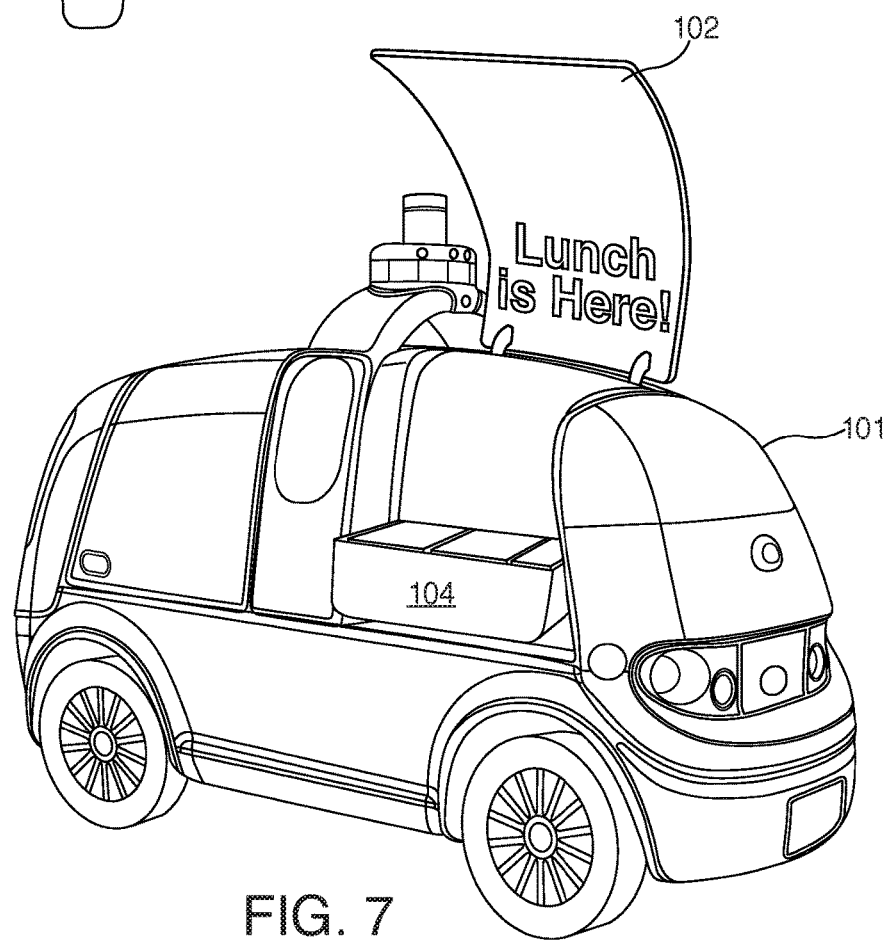
FIG. 7 is an exemplary ISO view of a robot vehicle, part of an autonomous robot fleet, illustrating an autonomous lunch delivery vehicle for any branded company.

As illustrated in FIG. 2, robots in the fleet are each configured for transporting, delivering or retrieving goods or services and are capable of operating in an unstructured open environment or closed environment. In some embodiments, the vehicle 101 is configured to travel practically anywhere that a small all-terrain vehicle could travel on land, while providing at least one and preferably two large storage compartments 102, and more preferably, at least one large compartment 102 is configured with smaller internal secure compartments 104 of variable configurations to carry individual items that are to be delivered to, or need to be retrieved from customers.

Alternately, in some embodiments, the vehicle could be configured for water travel, providing at least one and preferably two large storage compartments, and more preferably, at least one large compartment is configured with smaller internal secure compartments of variable configurations to carry individual items that are to be delivered to, or need to be retrieved from customers.

Further still, in some embodiments, the vehicle could be configured for hover travel, providing at least one and preferably two large storage compartments, and more preferably, at least one large compartment is configured with smaller internal secure compartments of variable configurations to carry individual items that are to be delivered to, or need to be retrieved from customers.

Further still, in some embodiments, the vehicle could be configured for aerial drone or aerial hover travel, providing at least one and preferably two large storage compartments, and more preferably, at least one large compartment is configured with smaller internal secure compartments of variable configurations to carry individual items that are to be delivered to, or need to be retrieved from customers.

Figure 8:
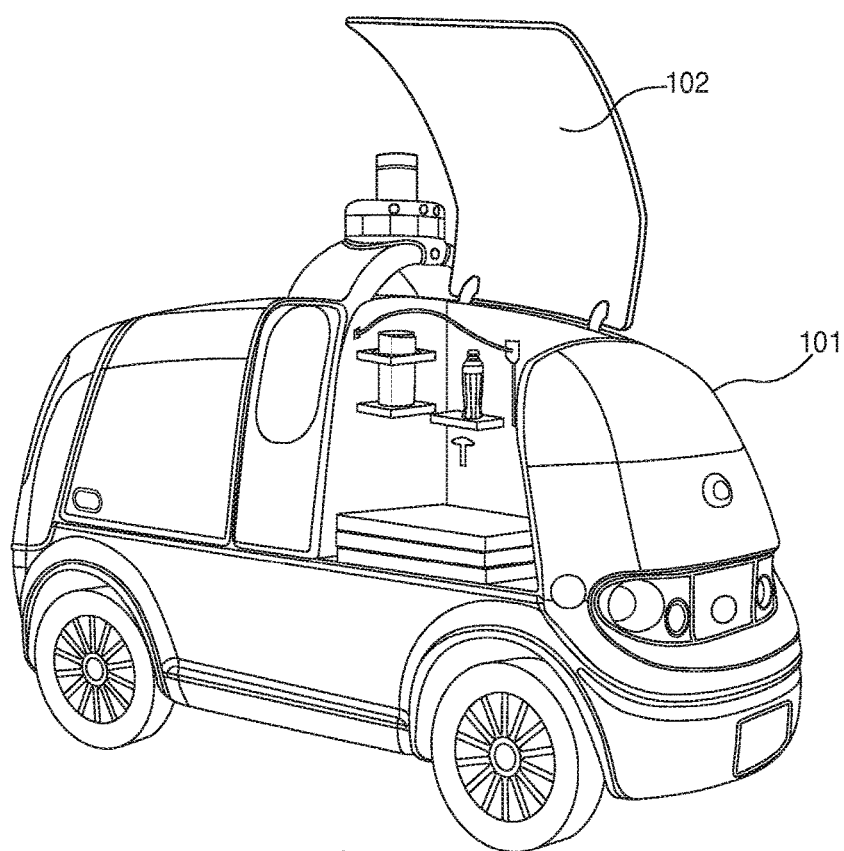
FIG. 8 is an exemplary ISO view of a robot vehicle, part of an autonomous robot fleet, illustrating an autonomous pizza delivery vehicle for any branded company.
Figure 9:
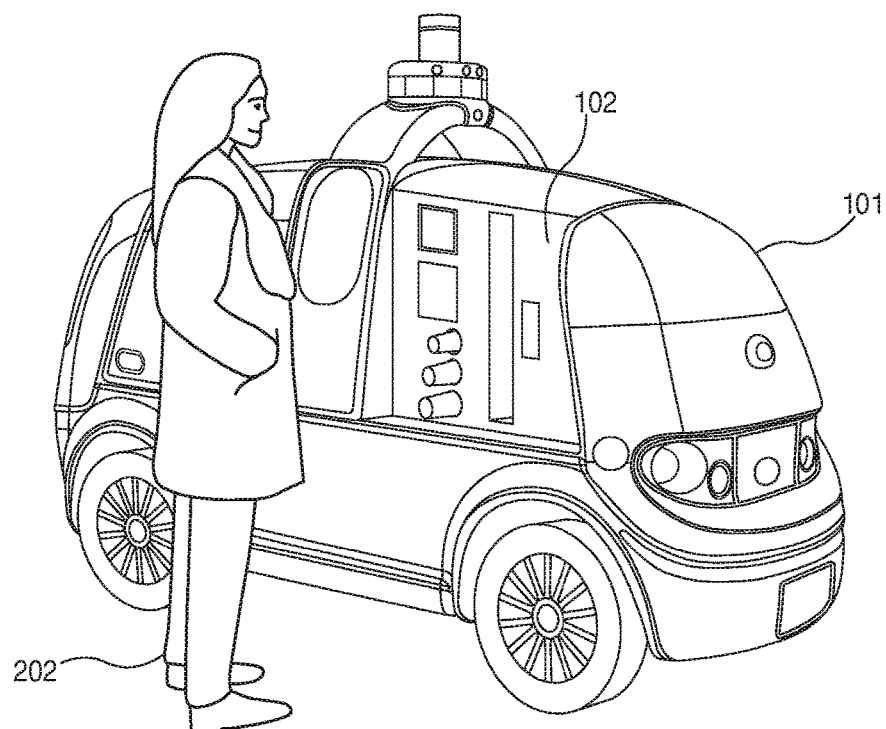
FIG. 9 is an exemplary ISO view of a robot vehicle, part of an autonomous robot fleet, illustrating an autonomous coffee delivery vehicle for any branded company.
Figure 10:
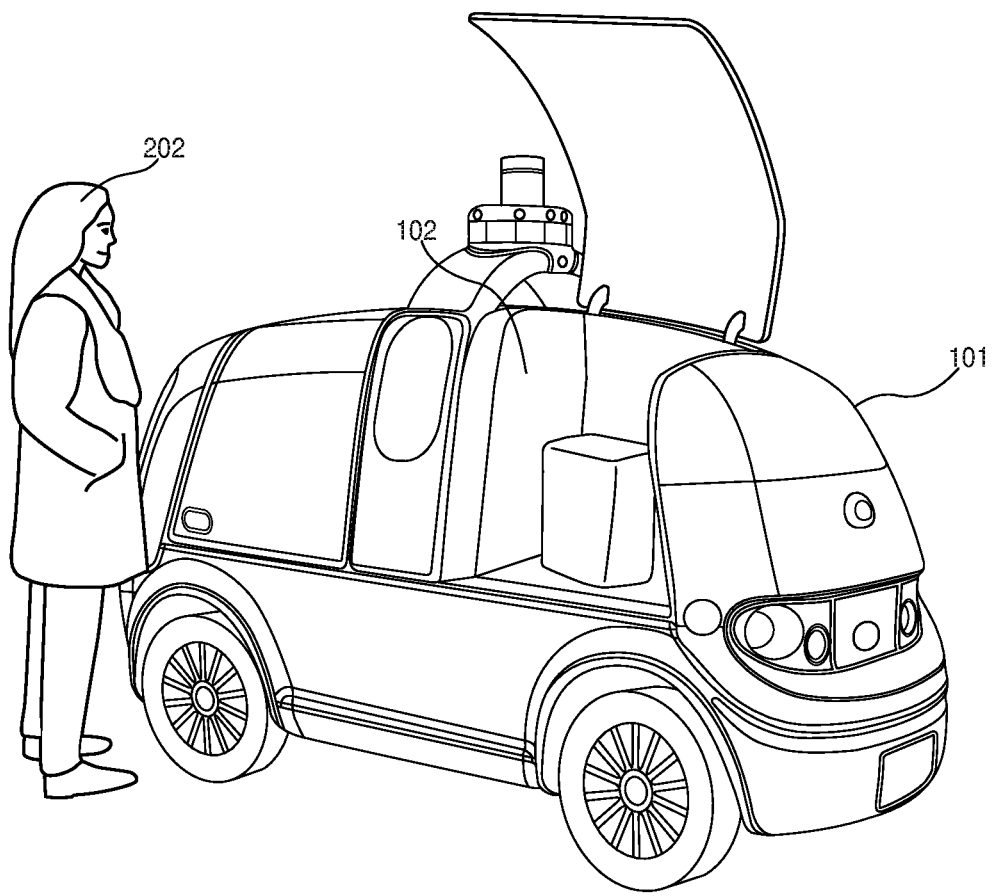
FIG. 10 is an exemplary ISO view of a robot vehicle, part of an autonomous robot fleet, illustrating an autonomous evening/nighttime delivery vehicle for any branded company, comprising a lighted interior.

As illustrated in FIGS. 7-10, in some embodiments, the securable compartments are humidity and temperature controlled for, for example, hot goods, cold goods, wet goods, dry goods, or combinations or variants thereof. Further still, as illustrated in FIGS. 8-10, the compartment(s) are configurable with various amenities, such as compartment lighting for night deliveries and condiment dispensers.

In some embodiments, the securable compartments are configurable for various goods. Such configurations and goods include: bookshelves for books, thin drawers for documents, larger box-like drawers for packages, and sized compartments for vending machines, coffee makers, pizza ovens and dispensers.

In some embodiments, the securable compartments are variably configurable based on: anticipated demands, patterns of behaviors, area of service, or types of goods to be transported.

Further still, each robot includes securable compartments to hold said goods or items associated with said services, and a controller 150 configurable to associate each one of the securable compartments 102, 104 to an assignable customer 202 or provider 204 and provide entry when authorized, Each robot vehicle further includes at least one processor configured to manage the conveyance system, the navigation module, the sensor system, instructions from the fleet management module, the communication module, and the controller.

As described previously, each robot is configured with securable compartments. Alternately, a robot is configurable to contain a set of goods or even a mobile marketplace (similar to a mini bar at a hotel).

When a robot is assigned to a customer 202, one or more of the compartments 102, 104 is also assigned to that customer. Each of the large compartments 12 is secured separately and can securely transport goods to a separate set of customers 202.

Upon arrival of the robot to the customer destination, the customer can then open their respective compartment(s) by verifying their identity with the robot. This can be done through a wide variety of approaches comprising, but not limited to:

1. The customer can be given a PIN (e.g., 4 digit number) when they make their initial request/order. They can then enter this pin at the robot using the robot touchscreen or a keypad.
2. The customer can verify themselves using their mobile phone and an RFID reader on the robot.
3. The customer can verify themselves using their voice and a personal keyword or key phrase they speak to the robot.
4. The customer can verify themselves through their face, a government ID, or a business ID badge using cameras and facial recognition or magnetic readers on the robot.
5. The customer can verify themselves using their mobile phone; by pushing a button or predetermined code on their phone (and the system could optionally detect the customer is near the robot by using their GPS position from phone)

Controller(s) and Processor(s)

In some embodiments, each robot in the robot fleet is equipped with one or more processors 125 capable of both high-level computing for processing as well as low-level safety-critical computing capacity for controlling the hardware. The at least one processor is configured to manage the conveyance system, the navigation module, the sensor system, instructions from the fleet management module, the communication module and the controller.

Further still, in some embodiments, each robot in the robot fleet is equipped with a controller 150 configurable to associate each one of the securable compartments 102, 104 to an assignable customer 202 or provider 204 and provide entry when authorized.

Additional Features

In some embodiments, the robot fleet further includes at least one robot having a digital display for curated content comprising: advertisements (i.e., for both specific user and general public), including services provided, marketing/promotion, regional/location of areas served, customer details, local environment, lost, sought or detected people, public service announcements, date, time, or weather.

Figure 13:
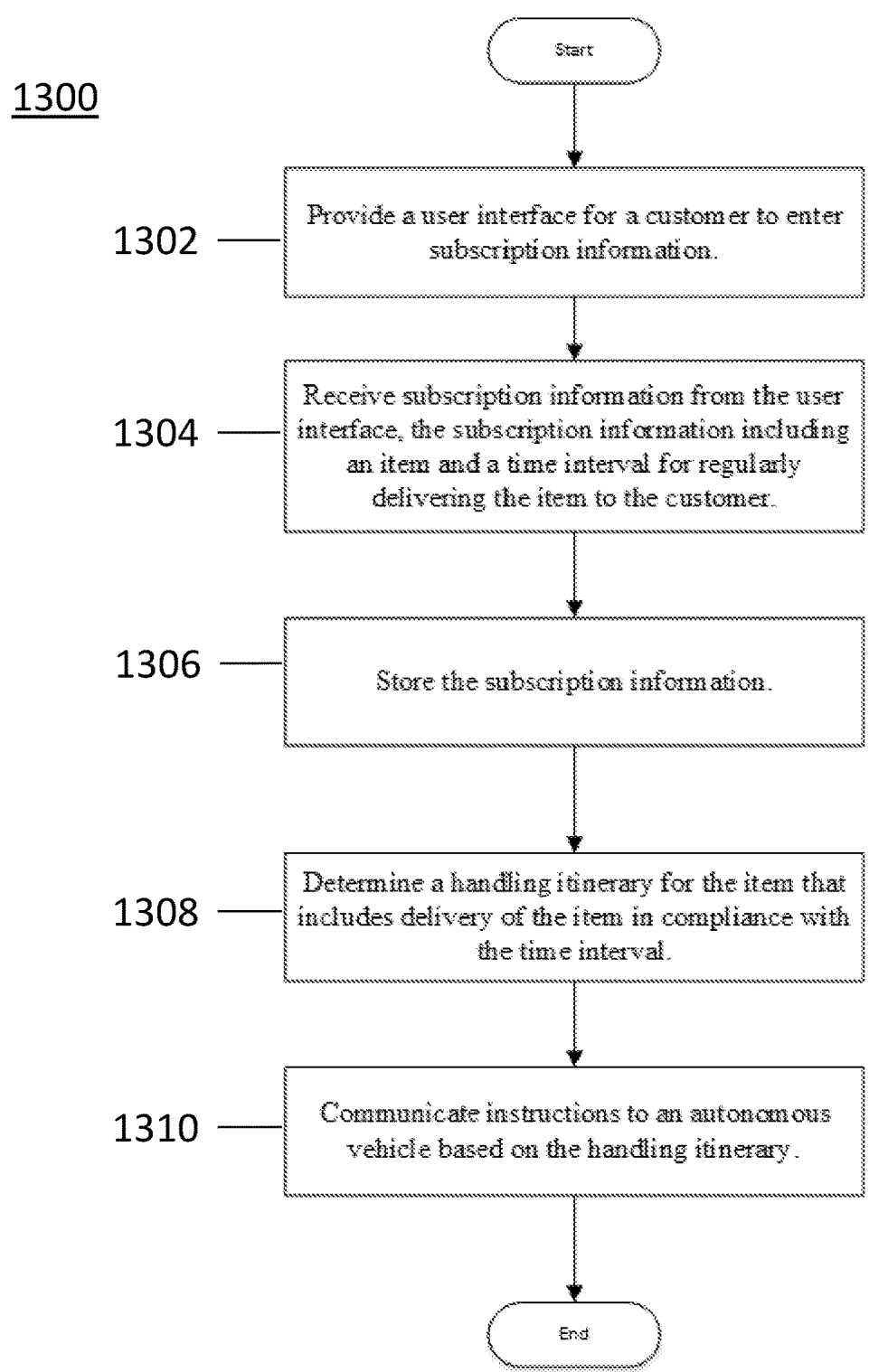
FIG. 13 is an exemplary flowchart representation illustrative of a high level method for providing autonomous delivery management.

Referring now to FIG. 13, there is shown a flow diagram of a method 1300 for providing autonomous delivery management for subscription services. Persons skilled in the art will appreciate that one or more operations of the method 1300 may be performed in a different order, repeated, and/or omitted without departing from the scope of the present disclosure. In various embodiments, the illustrated method 1300 can operate in the central server 110 of FIG. 11, in the fleet management module 120, or in another server or system. In various embodiments, some or all of the operations in the illustrated method 1300 can operate in the robot vehicle 101, such as using the components of FIG. 12. Other variations are contemplated to be within the scope of the present disclosure.

Initially at step 1302, the autonomous delivery management system provides a user interface for a customer to enter subscription information. In various embodiments, the user interface may be provided to the user on an app on a mobile device, a web app, a web browser, at a kiosk, or on a display screen of an autonomous vehicle. In various embodiments, the autonomous robot vehicle 101 may be configured to communicate with the device of the customer. In various embodiments, the user interface may be displayed on a mobile device, or on a display on the autonomous robot vehicle 101. The display may be touch screen. The user interface will be described in more detail below with reference to FIG. 14.

At step 1304, the autonomous delivery management system receives subscription information from the user interface. The subscription information includes an item and a time interval for regularly delivering the item to the customer. In various embodiments, the item may include, for example, a drug prescription, a grocery, and/or another consumable. In various embodiments, the subscription information may include several items and/or multiple time intervals for the items. In various embodiments, the subscription information can include a particular merchant, including a food merchant such as Burger King®, and can specify a subscription for a food item. In various embodiments, the subscription information may include an automatic payment method. The user can provide such information through the user interface (not shown), which can include fields for entering such information. At step 1306, the autonomous delivery management system stores the subscription information.

At step 1308, the autonomous delivery management system determines a handling itinerary for the item that includes delivery of the item in compliance with the time interval. In various embodiments, compliance with the time interval may include delivery within a predetermined amount of time of the delivery interval (e.g. a few hours, a day, or a week). For example, if the delivery interval is once a month, compliance with the time interval may include delivery within a few days of the date that the monthly interval lands on. In various embodiments, the handling itinerary may include a pickup location, a destination location, and a deadline for delivery.

At step 1310, the autonomous delivery management system communicates instructions to the autonomous robot vehicle 101 based on the handling itinerary. The instructions to the autonomous robot vehicle 101 can include, for example, instructions to pick up an item from a pickup location at a particular date or time, and instructions to deliver the item to a delivery location by a particular date or time. Aspects of the autonomous robot vehicle are described above herein, including aspect relating to navigation and autonomous travel.

In various embodiments, the autonomous delivery management system may transmit a notification about delivery details to the customer at a predetermined time before the delivery and receive a response from the customer. In various embodiments, the customer response may change the delivery details, such as, for example, changing a deadline for delivery, a location of delivery, a product being delivered, and/or a quantity of product. In various embodiments, the response from the customer may include a request to cancel delivery. In embodiments, the autonomous delivery management system may update the handling itinerary based on the response from the user, and communicate instructions to the autonomous vehicle based on the updated handling itinerary.

In various embodiments, a seller who provides the subscription items may store items in a compartment 102, 104 of the robot vehicle 101 prior to the order or after the subscription order has been placed. In various embodiments, the robot vehicle 101 can receive the item in a sub-compartment. In various embodiments, the robot vehicle 101 can determine which compartment or sub-compartment to assign to a particular user based on the seller's description of the item, which may include dimension information and weight information.

In various embodiments, the robot vehicle 101 stores the user's locations as well as other data points that would help identify the user, which for example, may include names, birthdays, PIN numbers, phone numbers, user accounts, and biometric information such as facial recognition or fingerprints. The robot vehicle 101 may use any combination of these to identify the user and allows only a verified user to access the vehicles' compartments 102, 104. In various embodiments, the user may use a smartphone app with their account logged in to access the robot vehicle 101. In various embodiments, the user receives a PIN code via a text message from the robot vehicle 101 that can be used to open the robot vehicle 101. In various embodiments, the system may use facial recognition or other biometric information to identify the user before permitting access to content inside the robot vehicle's 101 compartments 102, 104. In various embodiments, the data may include other approaches, such as, for example, RFID data, barcode data, QR code data, magnetic stripe data, optical character recognition data, and image scanner data. Such examples are merely illustrative, and other verification or identification mechanisms are contemplated to be within the scope of the present disclosure.

In various embodiments, the autonomous delivery management system receives a signal or other indication from the autonomous robot vehicle 101 indicating whether delivery of the item was successful or was unsuccessful. For example, the customer may not have been available at the delivery time to receive the subscribed items. In various embodiments, when the signal from the autonomous vehicle indicates that the delivery was unsuccessful, the autonomous delivery management system communicates additional handling instructions to the autonomous vehicle 101. For example, the additional handling instructions may instruct the autonomous vehicle 101 to return the undelivered item to a warehouse or to a merchant store. In various embodiments, the additional handling instructions may instruct the autonomous vehicle 101 to travel to a new location where the customer is located, or to return at a later time to re-attempt delivery. Other variations of additional handling instructions are contemplated.

In various embodiments, the autonomous delivery management system may utilize a location awareness feature. For example, the autonomous delivery management system can receives an indication from the user interface that location awareness is enabled. For example, the user interface may be provided on a GPS enabled smartphone app.

The GPS enabled smartphone app can transmit the location of the customer to the autonomous delivery management system.

The autonomous delivery management system can utilize the location feature to estimate when the customer will be at a particular location, modify the delivery time and/or location accordingly, and communicate instructions to an autonomous robot vehicle 101 based on the modified handling itinerary. For example, if the customer is set to receive a monthly delivery at home at 6 pm, the autonomous delivery management system may determine at 5:45 pm that the customer is not yet home based on the customer's location information. Based on that determination, the autonomous delivery management system can decide to delay the delivery, with or without confirming with the customer. When the autonomous delivery management system determines that the customer is home or estimates that the customer will be home at a particular time, the autonomous delivery management system can instruct the autonomous robot vehicle 101 having the customer's products to deliver the products.

In various embodiments, the autonomous delivery management system can confirm the subscription delivery with the customer prior to the scheduled delivery time. The autonomous delivery management system can send a notification to the customer at a predetermined amount of time (e.g., X mins/hours/days) prior to the scheduled delivery time, and can permit the customer to modify the details of the delivery, such as, for example, the timing or location of delivery, the quantity of the subscribed item, a change in the item to be delivered, or a cancellation of the delivery. If the autonomous delivery management system does not confirm the delivery with the customer and the delivery is unsuccessful, the autonomous delivery management system can provide additional handling instructions to the autonomous robot vehicle 101, as discussed above.

Figure 14:
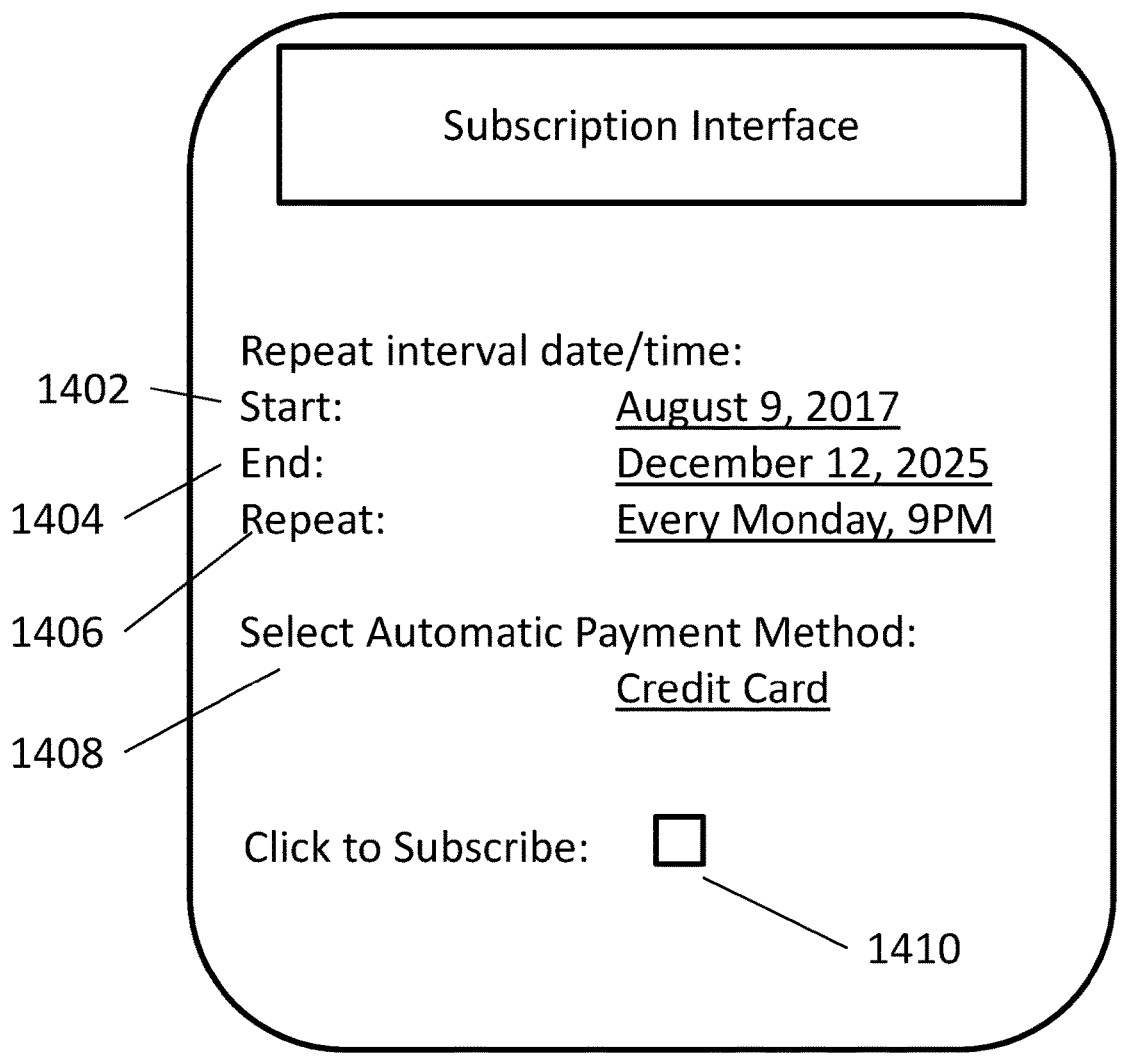
FIG. 14 is an exemplary view of a user interface for entering subscription information.

FIG. 14 shows a diagram of an exemplary user interface 1400 for entering subscription information in accordance with aspects of the present disclosure. In various embodiments, the user interface 1400 may include a region for entering a subscription start date 1402, a subscription end date 1404, the time interval 1406 for regularly delivering the item to the customer, the automatic payment method 1408, and a check box 1410 for designating an order as a subscription. In various embodiments, the start date 1402, end date 1404, and the time interval 1406 may be selected by using a calendar interface. The illustrated user interface is exemplary, and variations are contemplated to be within the scope of the present disclosure. For example, it is contemplated that other types of information can be provided through the user interface 1400, such as, without limitation, identity of a particular merchant, a delivery address, or any other information described above herein.

Accordingly, the customer can subscribe to a product once, and the system can automatically dispatch an autonomous vehicle to transport the product to the customer on a regular basis.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, Python, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The systems described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. An autonomous delivery management system comprising:

at least one processor; and a memory storing instructions which, when executed by the at least one processor, cause the at least one processor to:

provide a user interface for a customer to enter subscription information for an item;

receive the subscription information from the user interface, wherein the subscription information includes the item and a time interval for regularly delivering the item to the customer;

store the subscription information;

determine a handling itinerary for the item that includes a delivery of the item in compliance with the time interval within a time of the time interval;

assign a compartment or sub-compartment of an autonomous vehicle to the customer based on a seller description of the item that includes dimension information of the item and weight information of the item;

transmit, through an interaction with the autonomous vehicle, a telecommunication message to the customer, wherein the telecommunication message includes a code that opens the compartment or sub-compartment of the autonomous vehicle;

transmit, to the customer, a notification of details of the delivery before the delivery;

receive, from the customer, a response that includes a change associated with the details of the delivery;

based on the response, implement a change to the handling itinerary;

confirm the change to the handling itinerary with the customer; and transmit further instructions to the autonomous vehicle based on the change to the handling itinerary.

2. The autonomous delivery management system of claim 1, wherein the item includes at least one of a drug prescription, a grocery, or another consumable.

3. The autonomous delivery management system of claim 1, wherein the subscription information includes an automatic payment method.

4. The autonomous delivery management system of claim 1, wherein the handling itinerary includes at least one of a pickup location, a destination location, or a deadline for the delivery.

5. The autonomous delivery management system of claim 1, wherein the instructions, when executed by the at least one processor, further cause the syctcm at least one processor to:

obtain an indication from the autonomous vehicle indicating whether the delivery was successful or unsuccessful; and in a case where the indication from the autonomous vehicle indicates that the delivery was unsuccessful, communicating transmit further instructions to the autonomous vehicle for additional handling of the item.

6. The autonomous delivery management system of claim 1, wherein the instructions, when executed by the at least one processor, further cause the at least one processor to:

obtain an indication from the user interface that location awareness is enabled;

obtain customer location information from the user interface;

modify the handling itinerary for the item based on the customer location information to generate a modified handling itinerary; and transmit additional instructions to the autonomous vehicle based on the modified handling itinerary.

7. The autonomous delivery management system of claim 1, wherein the subscription information further includes a plurality of items including the item.

8. The autonomous delivery management system of claim 1, wherein the subscription information further includes a plurality of time intervals for regularly delivering the item to the customer including the time interval.

9. The autonomous delivery management system of claim 1, wherein additional customer identification information is further configured to open the autonomous vehicle.

10. The autonomous delivery management system of claim 1, wherein the instructions, when executed by the at least one processor, further cause the at least one processor to:

provide, to the customer at a predetermined time before the delivery, a notification about a quantity of the item; and obtain, from the customer, an indication including a change to the quantity of the item.

11. A computer implemented method for providing autonomous delivery management, the computer implemented method comprising:

providing, by a processor of an autonomous delivery management system, a user interface for a customer to enter subscription information for an item;

receiving, by the processor, the subscription information from the user interface, wherein the subscription information includes the item and a time interval for regularly delivering the item to the customer;

storing, by the processor, the subscription information;

determining, by the processor, a handling itinerary for the item that includes a delivery of the item in compliance with the time interval within a time of the time interval;

assigning, by the processor, a compartment or sub-compartment of an autonomous vehicle to the customer based on a seller description of the item that includes dimension information of the item and weight information of the item;

transmitting, by the processor, through an interaction with the autonomous vehicle, a telecommunication message to the customer, wherein the telecommunication message includes a code that opens the compartment or sub-compartment of the autonomous vehicle;

transmitting, by the processor, to the customer, a notification of details of the delivery before the delivery;

receiving, by the processor, from the customer, a response that includes a change associated with the details of the delivery;

based on the response, implementing, by the processor, a change to the handling itinerary;

confirming, by the processor, the change to the handling itinerary with the customer; and transmitting, by the processor, further instructions to the autonomous vehicle based on the change to the handling itinerary.

12. The computer implemented method of claim 11, wherein the item includes at least one of a drug prescription, a grocery, or another consumable.

13. The computer implemented method of claim 11, wherein the subscription information includes an automatic payment method.

14. The computer implemented method of claim 11, wherein the handling itinerary includes at least one of a pickup location, destination location, or a deadline for the delivery.

15. The computer implemented method of claim 10, the method further including:

obtaining, by the processor, an indication from the autonomous vehicle indicating whether the delivery was successful or unsuccessful; and in a case where the indication from the autonomous vehicle indicates that the delivery was unsuccessful, communicating transmitting, by the processor, further instructions to the autonomous vehicle for additional handling of the item.

16. The computer implemented method of claim 10, the method further including:

obtaining, by the processor, an indication from the user interface that location awareness is enabled;

obtaining, by the processor, customer location information from the user interface;

modifying, by the processor, the handling itinerary for the item based on the customer location information to generate a modified handling itinerary; and transmitting, by the processor, additional instructions to the autonomous vehicle based on the modified handling itinerary.

17. The computer implemented method of claim 11, the method further including:

providing, by the processor, to the customer at a predetermined time before the delivery, a notification about a quantity of the item; and obtaining, by the processor, from the customer, an indication including a change to the quantity of the item.

18. An apparatus comprising:

at least one processor; and a memory storing instructions which, when executed by the at least one processor, cause the at least one processor to:

provide a user interface for a customer to enter subscription information for an item;

receive the subscription information from the user interface, wherein the subscription information includes the item and a time interval for regularly delivering the item to the customer;

store the subscription information;

determine a handling itinerary for the item that includes delivery of the item in compliance with the time interval within a time of the time interval;

assign a compartment or sub-compartment of an autonomous vehicle to the customer based on a seller description of the item that includes dimension information of the item and weight information of the item;

transmit, through an interaction with the autonomous vehicle, a telecommunication message to the customer, wherein the telecommunication message includes a code that opens the compartment or sub-compartment of the autonomous vehicle;

transmit, to the customer, a notification of details of the delivery before the delivery;

receive, from the customer, a response that includes a change associated with the details of the delivery;

based on the response, implement a change to the handling itinerary;

confirm the change to the handling itinerary with the customer; and transmit further instructions to the autonomous vehicle based on the change to the handling itinerary.

19. The apparatus of claim 18, wherein the item includes at least one of a drug prescription, a grocery, or another consumable.

20. The apparatus of claim 18, wherein the subscription information includes an automatic payment method.

* * * * *